United States Patent [19]
Howie, Jr.

[11] Patent Number: 4,608,882
[45] Date of Patent: Sep. 2, 1986

[54] KNOB WITH DECORATIVE END CAP
[75] Inventor: Robert K. Howie, Jr., Decatur, Ill.
[73] Assignee: The Grigoleit Company, Decatur, Ill.
[21] Appl. No.: 639,230
[22] Filed: Aug. 9, 1984

Related U.S. Application Data

[62] Division of Ser. No. 439,330, Nov. 5, 1982, abandoned.

[51] Int. Cl.$^4$ .............................................. G05G 1/02
[52] U.S. Cl. ........................................ 74/548; 74/553
[58] Field of Search ..................... 74/553, 548; 16/121, 16/DIG. 30, 118; 40/331; 292/347; 403/274

[56] References Cited

U.S. PATENT DOCUMENTS

| | | | |
|---|---|---|---|
| 1,520,534 | 12/1924 | Cruver | 40/331 X |
| 1,846,476 | 2/1932 | Degenhart et al. | 40/331 |
| 2,172,977 | 9/1939 | Kimball | 74/553 X |
| 2,341,647 | 2/1944 | Parkhurst | 74/553 X |
| 2,430,727 | 11/1947 | Morgen | 292/347 |
| 2,632,540 | 3/1953 | Smith | 74/553 X |
| 2,812,967 | 11/1957 | Falk | 292/347 |
| 3,410,247 | 11/1968 | Dronberger | 74/553 X |
| 3,977,105 | 8/1976 | Tsubouchi | 40/331 X |

FOREIGN PATENT DOCUMENTS

| | | | |
|---|---|---|---|
| 775537 | 12/1934 | France | 40/331 |
| 351165 | 6/1931 | United Kingdom | 16/121 |
| 1599531 | 10/1981 | United Kingdom | 16/121 |

Primary Examiner—Gary L. Smith
Assistant Examiner—Rodney M. Lindsey
Attorney, Agent, or Firm—Kinzer, Plyer, Dorn & McEachran

[57] ABSTRACT

A cylindrical knob for installation on a shaft and a method for fastening a decorative disc shaped end cap to a tubular knob body to make the cylindrical knob. The cylindrical knob includes a plastic tubular body having an outer sleeve and an inner core. The inner core is spaced from the outer sleeve at the cap receiving end of the body to form an annular slot. The inner core has a cap supporting surface located adjacent the inner slot and a shaft receiving socket located at the opposite end of the tubular body. An undercut surface is formed in the inner core adjacent to the cap supporting surface and accessible from the annular slot. Passages extend from the socket end of the tubular body to the annular slot. Recesses are formed in the inner core beneath the undercut surface and are spaced generally uniformly around the inner core and open into the annular slot. A disc shaped end cap having a depending skirt is positioned on the cap supporting surface with the skirt located in the annular slot. The lower portion of the skirt is reduced in thickness with the reduction taking place along a relatively short transition zone to provide a defined bending line. The cap is attached to the tubular body by deforming the skirt into the recesses and against the undercut surface of the inner core.

8 Claims, 5 Drawing Figures

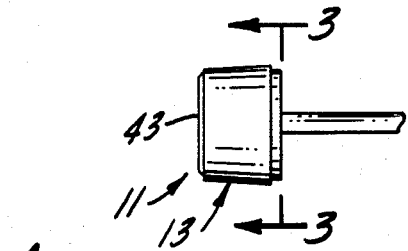
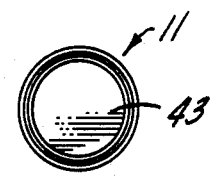
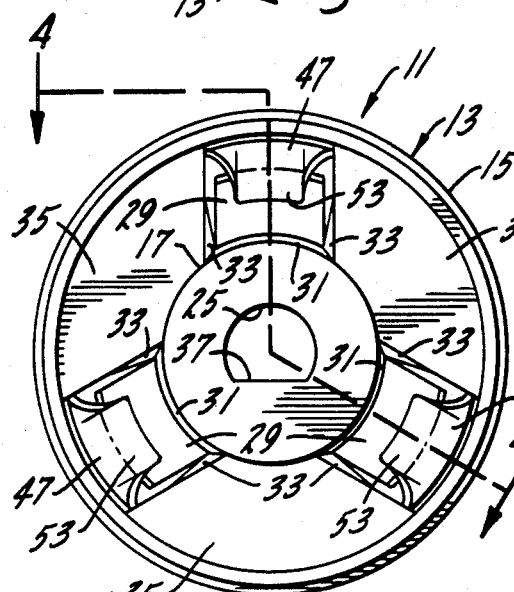
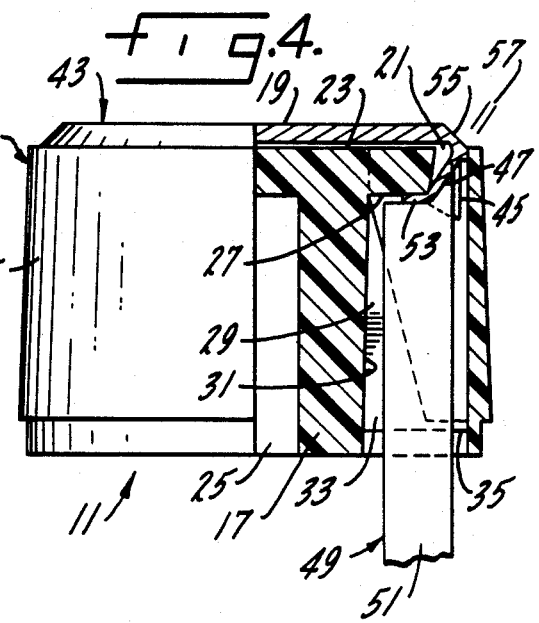
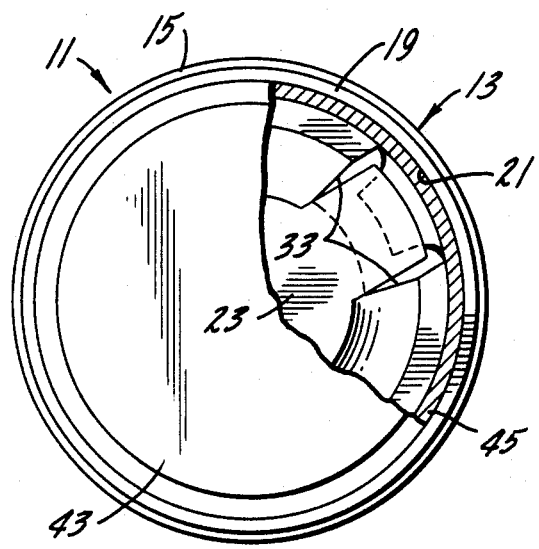

KNOB WITH DECORATIVE END CAP

This is a division of application Ser. No. 439,330, filed Nov. 5, 1982, now abandoned.

BACKGROUND AND SUMMARY OF THE INVENTION

This invention is directed to a cylindrical knob of the type which fits on a control shaft and particularly to a knob which has a plastic body and a decorative metal end cap. Previously, the metal end caps of such knobs have been equipped with tabs which had to be inserted into slots in the plastic body. The tabs are bent after insertion to secure the metal cap to the plastic body. The assembly of such knobs required the orientation of the cap tabs relative to the slots in the body. Also, the tabs are easily bent or broken causing additional assembling problems and defective assembled knobs.

An object of this invention is a cylindrical knob having a metal end cap which can be assembled to the plastic body more easily than metal caps equipped with tabs.

Another object of this invention is a cylindrical knob having a metal end cap that can be assembled without orientation of the cap relative to slots in the plastic body.

Another object of this invention is a cylindrical knob having a metal end cap which is locked to the plastic body of the knob by being swaged to the plastic body thus providing a stronger attachment than that which was obtained by tabs and slots.

Another object of this invention is a metal end cap for a plastic knob which cap has a skirt with an end portion which is thinner than its waist portion with the reduction in thickness occurring along a relatively short transition zone to facilitate bending of the skirt for attachment to the plastic knob.

Another object is a metal end cap for a plastic knob which cap has a skirt with the end portion of the skirt reduced in thickness to facilitate attachment of the cap to the plastic body of the knob by bending the end of the skirt.

Other objects can be found in the following specification, claims and drawings:

BRIEF DESCRIPTION OF THE DRAWINGS

The invention is illustrated more or less diagrammatically in the following drawings wherein:

FIG. 1 is a side elevational view of the knob of this invention mounted on a shaft;

FIG. 2 is a front end view of the knob of this invention;

FIG. 3 is a rear view of the knob of this invention on an enlarged scale;

FIG. 4 is a partial cross sectional view taken along line 4—4 of FIG. 3 and showing a tool for attaching the end cap to the knob;

FIG. 5 is a front view of the knob of FIG. 1 on an enlarged scale with a portion of the decorative metal cap cut away to show details of the interior of the knob.

DESCRIPTION OF THE PREFERRED EMBODIMENT

The invention is shown embodied in a cylindrical knob 11 which includes a plastic tubular body 13 integrally formed of an outer sleeve 15 and an inner core 17. The inner core is spaced from the outer sleeve at the cap receiving end 19 of the tubular body to form an annular slot 21. The inner core is formed with a cap receiving and supporting surface 23 located adjacent the annular slot and a shaft receiving socket 25 located at the opposite end of the tubular body. An undercut surface 27 is formed in the inner core adjacent the cap receiving surface 23. The undercut surface is accessible from the annular slot 21. Three longitudinally extending passages 29 are formed in the tubular body and extend from the socket end of the body to the annular slot. Recesses 31 are formed in the inner core beneath the undercut surface 27 and are spaced generally uniformly around the inner core. Each recess opens into the annular slot 21. In this embodiment, each recess is defined by longitudinally extending walls 33 which are also the defining walls of the passages 29. These walls end at the annular slot 21 adjacent the cap supporting surface 23. At the socket end of the plastic tubular body, fan shaped radially extending walls 35 extend between the inner core 17, outer sleeve 15 and the walls 33.

The shaft receiving socket 25 is generally circular in cross section having one flat wall 37. A tubular metal sleeve is usually inserted into the shaft receiving socket and it also has a flat wall which engages and conforms with the flat wall 37 of the socket. The tubular metal sleeve functions as a reinforcing member for the socket and it fits over and engages the shaft which is inserted in the socket. However, this sleeve has been omitted from the drawings for clarity of illustration.

A disc shaped end cap 43 preferably made of a metal such as aluminum is mounted on the cap receiving end 19 of the plastic tubular body 13. The cap has a depending skirt 45 which fits into the annular slot 21 of the plastic tubular body. The skirt is seated on the annular slot and is swaged at 47 into the recesses 31 formed on the surface of the inner core 17 of the plastic tubular body. The swaging of the skirt of the cap fastens the cap to the tubular body and prevent its rotation. The skirt is swaged into position by a tool 49 having fingers 51, only one of which is shown, which extend through the passages 29 into the annular slot 21. Preferably the skirt of the cap is swaged into the three recesses 31 in one simultaneous action although theoretically it could be done one at a time. It should be noted that it is not necessary to align the cap or its skirt with the recesses 31 in order to fasten the cap to the plastic tubular body. It is only necessary to insert the skirt into the annular slot until the cap is resting on the cap support surface 23 of the inner core.

The force necessary to crimp the skirt of the disc shaped cap 43 into the recesses 31 is reduced by necking down the lower portion 53 of the skirt 45. By making the lower portion 53 of the skirt 45 thinner than the waist 55 of the disc shaped cap 43 it is possible to assemble the cap onto the plastic tubular body within the use of excessive force which would leave pressure marks on the cap of the type detrimental to its decorative appearance. The skirt is "necked down" or reduced in thickness along a relatively short transition zone 57 to form a predefined area or line of bending when the skirt is crimped. The crimping of the skirt into the recesses 31 between the walls 33 not only holds the cap onto the plastic tubular body but prevents it from rotating because of engagement between the swaged portions of the skirt 45 and the walls.

I claim:

1. A cylindrical knob for installation on a shaft, the knob including:

a plastic tubular body having an outer sleeve, an integral inner core, a cap receiving end and an opposite end, with the inner core being spaced from the outer sleeve at the cap receiving end of the body to form an annular slot, the inner core having a cap supporting surface located adjacent the annular slot and a shaft receiving socket located at the opposite end of the tubular body, an undercut surface formed in said inner core adjacent the cap supporting surface and accessible from the annular slot, at least one passage extending from the socket end of the tubular body to the annular slot, and a disc-shaped end cap having a depending annular skirt positioned on the cap supporting surface with the skirt located in the annular slot, the skirt being deformed against the undercut surface of the inner core at spaced locations to fasten the end cap to the tubular body.

2. The cylindrical knob of claim 1 in which at least two recesses are formed in the inner core beneath the undercut surface with the recesses spaced generally uniformly around the inner core and opening into the annular slot.

3. The cylindrical knob of claim 1 in which three recesses are formed in the inner core beneath the undercut surface with the recesses being spaced generally uniformly around the inner core and opening into the annular slot.

4. The cylindrical knob of claim 2 in which a separate passage extending from the socket end of the tubular body to the annular slot is provided for each recess.

5. The cylindrical knob of claim 3 in which a separate passage extending from the socket end of the tubular body to the annular slot is provided for each recess.

6. The cylindrical knob of claim 1 in which the depending skirt is formed with a waist portion and an end portion in which the end portion is thinner than the waist portion, and the end portion of the skirt is deformed when the end cap is fastened to the tubular body.

7. The cylindrical knob of claim 2 in which the depending skirt is formed with a waist portion and an end portion in which the end portion is thinner than the waist portion, and the end portion of the skirt is deformed into the recesses when the end cap is fastened to the tubular body.

8. The cylindrical knob of claim 3 in which the depending skirt is formed with a waist portion and an end portion in which the end portion is thinner than the waist portion, and the end portion of the skirt is deformed into each of the three recesses when the end cap is fastened to the tubular body.

* * * * *